Nov. 23, 1965   D. H. LYMBURNER ETAL   3,219,126
LAND WHEEL STEERING MEANS
Filed April 1, 1964   4 Sheets-Sheet 1

INVENTORS.
DOUGLAS H. LYMBURNER
HENNING ISACHSEN
BY
Roger C. Johnson
ATTORNEY

Nov. 23, 1965    D. H. LYMBURNER ETAL    3,219,126
LAND WHEEL STEERING MEANS
Filed April 1, 1964    4 Sheets-Sheet 4
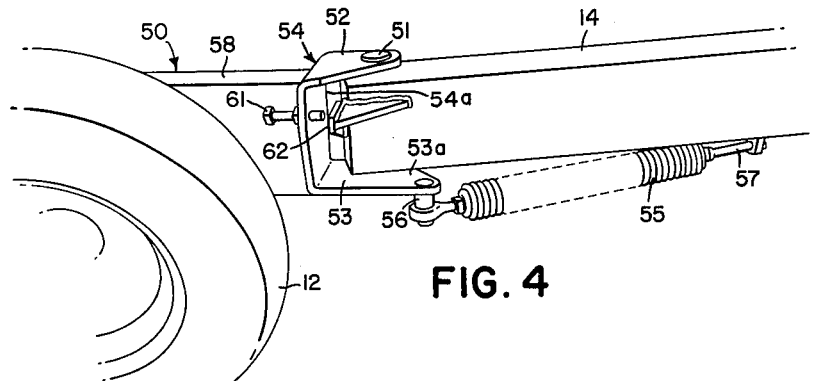
FIG. 4
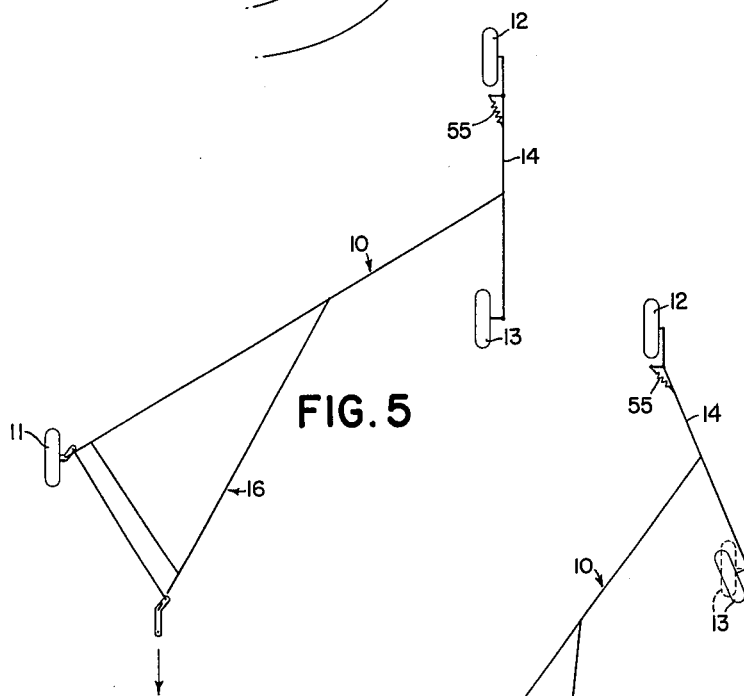
FIG. 5
FIG. 6
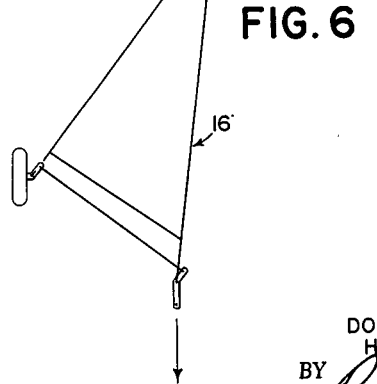
INVENTORS.
DOUGLAS H. LYMBURNER
HENNING ISACHSEN
BY Roger C. Johnson
ATTORNEY

United States Patent Office 3,219,126
Patented Nov. 23, 1965

3,219,126
LAND WHEEL STEERING MEANS
Douglas H. Lymburner, Fonthill, Ontario, and Henning Isachsen, St. Catherines, Ontario, Canada, assignors to Deere & Company, Moline, Ill., a corporation of Delaware
Filed Apr. 1, 1964, Ser. No. 356,425
5 Claims. (Cl. 172—286)

The present invention relates generally to agricultural implements and more particularly to large capacity ground-working implements, such as disk tillers and the like. An object of this invention is the provision of a disk tiller or similar ground-supported implement having new and improved means for changing the position of certain of the ground wheels when the ground-working disks of the tiller are lowered. Another object of this invention is to provide means for conditioning the changeability of the position of the land wheel of the disk tiller when the disks are raised into a transport position.

Still further, an important feature of this invention is the provision of a disk tiller of the type normally operating in a generally diagonal position, in which means is provided for conditioning the steerability of one of the ground wheels so as to permit turning of the implement into a more narrow position so as to facilitate transport of the implement when the disks are raised out of engagement with the ground.

Another feature of this invention is the provision of a disk tiller having a new and improved rear end construction that includes a laterally swingable rear furrow wheel mounted to yield when making a left turn but biased to swing toward a straight ahead trailing position when operating under normal working conditionss.

These and other objects and advantages of this invention will be apparent to those skilled in the art after a consideration of the following detailed description, taken in conjunction with the accompanying drawings, in which:

FIG. 4 is a perspective view of the rear furrow wheel arrangement.

FIG. 5 is a diagrammatic fragmentary plan view showing the positions of the tiller supporting wheels in normal operating position.

FIG. 6 is a view similar to FIG. 5, showing the positions of the tiller wheels when being transported under extreme loose ground conditions, the rear end having fallen back due to the resistance of the loose ground, and showing the land wheel repositioned so as to be aligned with the direction of transport.

In the following description, right-hand and left-hand reference is determined by standing to the rear of the disk tiller and facing the direction of travel.

Figure 1:
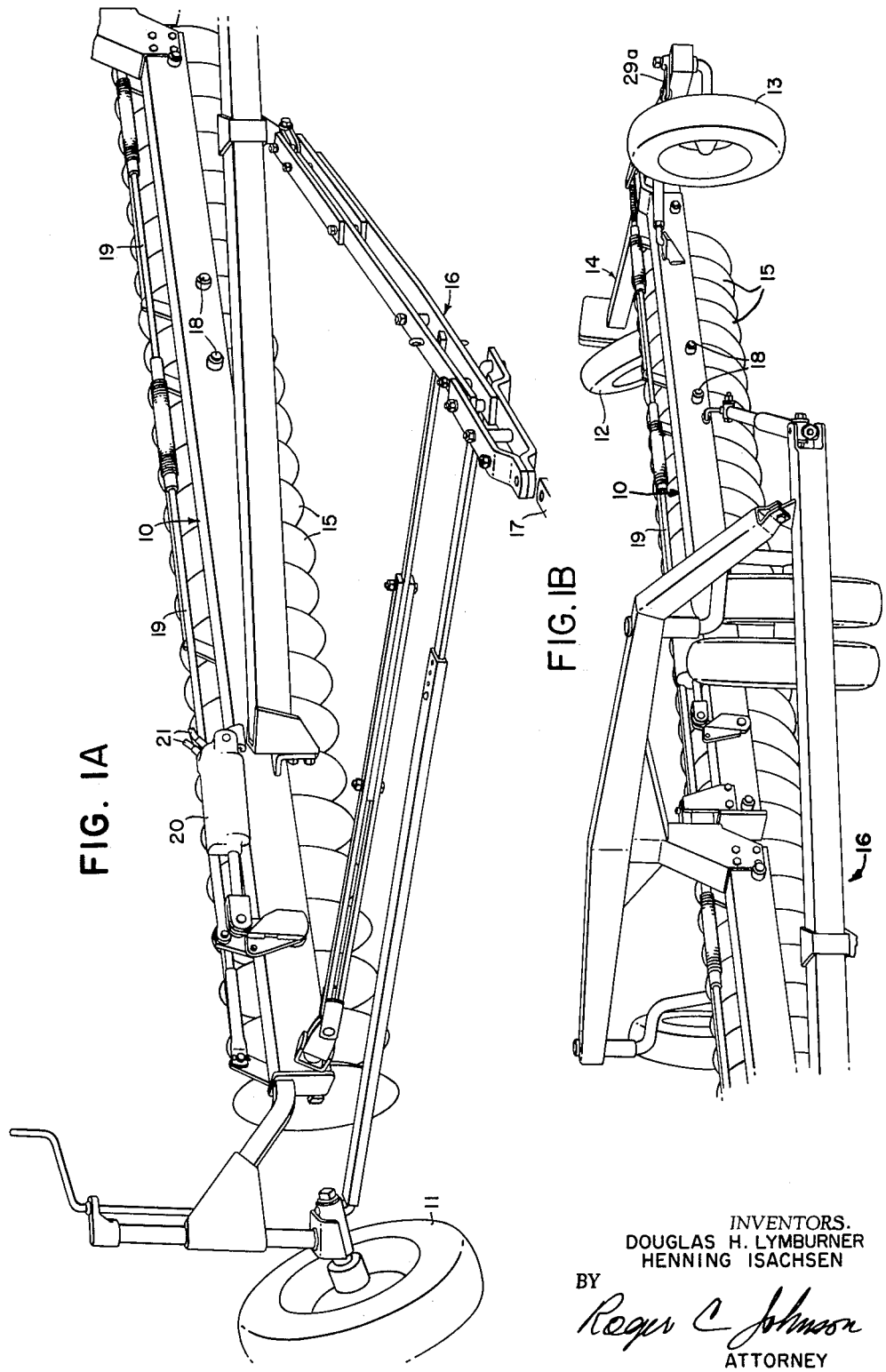
FIGS. 1A and 1B are perspective views of a disk tiller incorporating the principles of this invention, the tiller being shown in its ground-working position.

Referring first to FIGS. 1A and 1B, the disk tiller of this invention is shown as incorporating a main frame 10 that is normally disposed in a generally diagonal position relative to the direction of forward travel and supported on a front furrow wheel 11, a rear furrow wheel 12 and a rear land wheel 13, the two latter wheels being carried on a rear frame member 14 that normally extends in a generally fore-and-aft direction. The tiller is shown as provided with a plurality of gangs of soil-working disks 15, and draft is applied to the tiller by a hitch frame 16 normally disposed well toward the right forward end of the tiller frame. The tiller is normally pulled by a farm tractor in the usual way, the tractor being represented by the drawbar 17. The several gangs of disks are connected with the main frame 10 by generally vertical swingable bails 18 interconnected by lift rod means 19 that are movable generally longitudinally of the main frame 10 by any suitable power means, such as a hydraulic cylinder 20. The tractor 17 carries suitable power lift hydraulic means operatively connected with the cylinder 20 as through hose lines 21, so that the disks may be raised and lowered by the operator on the tractor. In the normal operation of the tiller, extension of the power cylinder 20 acts through the lift rod means 19 to swing the bails 18 so as to raise the disks into a transport position, and retraction of the cylinder serves to shift the lift rod means in the other direction and lowers the disks relative to the main frame into their ground-engaging or ground-working position.

Figure 3:
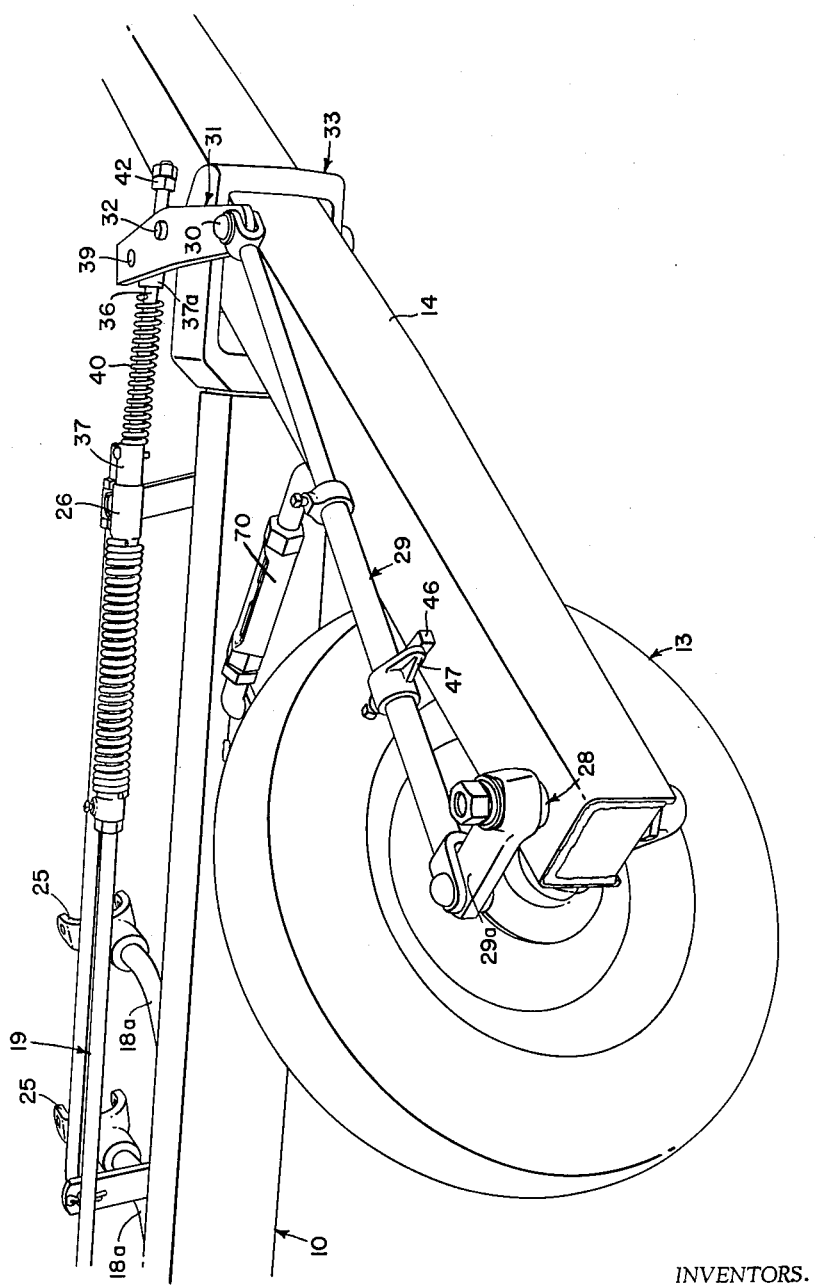
FIG. 3 is a view similar to FIG. 2 but showing the land wheel in its resteered position which tends to bring the rear portion of the tiller frame behind the front portion, thus narrowing the implement to facilitate transport.

As will best be seen from FIG. 3, each gang of disks 15 is carried on a pair of bails having bail arms 18a, the end of which carries pivoted yokes 25 connected to the associated bearing members in which the gang shift is journaled for rotation. The lift rod means 19 is connected in any suitable way, as at 26, to one of the bails of each gang of disks so that longitudinal movement of the lift rod along the main frame of the disk tiller serves to raise and lower the gangs of disks relative to the main frame, this being effected by extension or retraction of the power cylinder 20.

Figure 2:
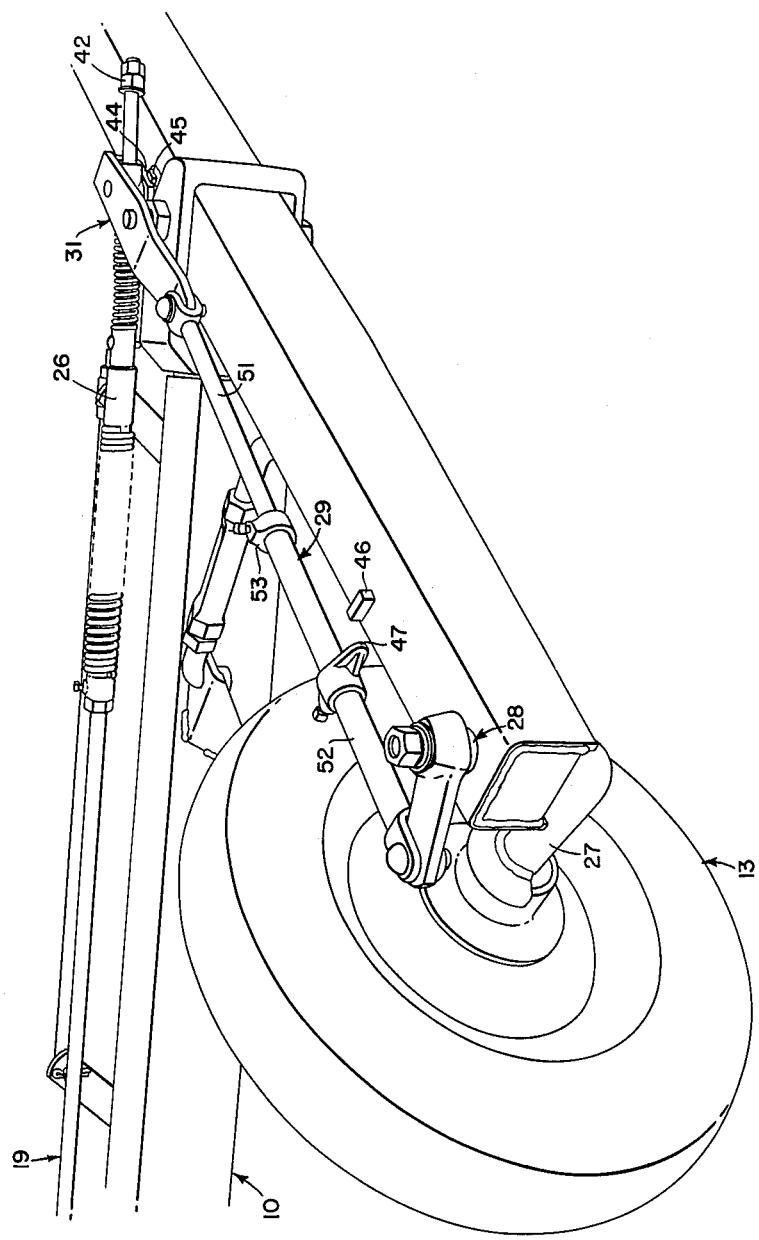
FIG. 2 is an enlarged perspective view of the rear portion of the disk tiller of FIG. 1B, showing the land wheel disposed in its fore-and-aft extending position corresponding to the working position of FIG. 1B.

The land wheel 13 is mounted for rotation on the laterally extending axle section 27 (FIG. 2) of a land wheel spindle 28 that is journaled for rotation about a generally vertical axis in the forward portion of the rear frame 14. A steering arm 29a is fixed to the upper end of the spindle 28 and pivotally receives the forward end of a telescoping rod member 29, the rear end of which is pivoted, as at 30, to the forward end of a lever 31 that is mounted for swinging movement in a horizontal plane about a stud 32 that is carried by the rear yoke 33 that is fixed rigidly to the rear end of the main frame 10. A connection is provided between the rear end of the lift rod 19 and the rear end of the arm 31, this connection preferably taking the form of a rod 36 connected by means of a pin and collar arrangement 37 with the rear end of the lift rod 19, the rearmost portion of the rod 36 extending through a trunnion 37a that is swingably connected, as at 39, with the rear end of the lever 31. A spring 40 is disposed between the rear end of the rod 19 and the lever 31, and an adjustable abutment 42 is carried by the rear end of the link or rod 36 on the side of the lever 31 opposite the spring 40.

Thus, when the tools are raised into their transport position, FIG. 3, the locking lever 31 is forced out of its locked position (FIG. 2) by the threaded abutment 42 on rod 36 contacting the trunnion 37a and pulling the rear end of lever 31 to the right. The land wheel 13 is then free to rotate in a clockwise direction about the spindle pivot 28. This rotation is caused by the ground resistance to the forward motion of the land wheel. When the tools are lowered into their soil-working position, the lever 31 is moved into the position shown in FIG. 2 which disposes the land wheel 13 parallel to the frame member 14. In this position the lever 31 moves into a generally overcenter position relative to the link 29, thus locking the wheel 13 in the position shown in FIG. 2. This position is determined by the rear lower portion 44 of the lever 31 striking an abutment or stop 45. Suitable stop means is provided for holding the wheel 13 in its angled position (FIG. 3), such stop means including an abutment 46 on the frame member 14 against an adjustable stop 47 on the forward portion of the link 29.

The rear furrow wheel 12, as shown in FIG. 4, is carried on a rearwardly extending laterally swingable arm 50 connected at its forward end by a vertical pivot 51 that is received in the upper and lower portions 52 and 53 of a yoke 54 fixed to and forming the forward end of the arm 50. The lower portion 53 is extended, as at 53a to form a lever arm to which a biasing spring 55 is connected by means of a stud 56. The other end of the spring 55 is connected to the frame member 14 by an adjustable screw 57. The bias of the spring 55 is exerted on the arm 50 so as to swing the latter in a landward direction (to the right counterclockwise about the pivot 51). However, as when making a left-hand turn, the rear furrow wheel 12 may, by the yielding of the spring 55, swing furrowwardly (to the left clockwise about the pivot 51). Movement in this direction is unrestricted until the left-hand vertical line of the yoke 54 contacts the left-hand side of the frame member 14. In this position the included angle between the furrow wheel support arm 50 and the frame member 14 will be less than 90°. When the machine is in a normal working position, with the thrust of the disks being absorbed by the left-hand side of the furrow wheel 12, the adjustable set screw 61 engages with the stop 62. The relative working angle of the rear furrow wheel to the disks is determined in part by the set screw adjustment. The other angling adjustment for this wheel is the turnbuckle 70 which diagonally connects the rear of the main frame 10 to the front right-hand face of the frame member 14.

Referring again to FIGS. 1A and 1B, and to FIG. 5 which illustrates the normal working position of the implement, the main frame 10 extends generally diagonally relative to the direction of forward travel while the hitch 16 is disposed well toward the forward or right-hand end of the frame 10. The diagonal position shown is a result, at least partly, of the curvature of the disks 15, which causes the implement to remain in the diagonal position even though the draft pull is applied at a point well toward the right of the frame. As a result of this arrangement, when the implement encounters loose ground conditions and the disks are raised out of engagement with the ground, the effect of the excessive resistance of the soft ground against the rear furrow wheel 12 and land wheel 13, is to cause the rear or left end of the machine to swing rearwardly and to the right into the position shown in FIG. 6 where the wheels 12 and 13 tend to be dragged through the soil instead of rolling freely in the forward direction. However, the spring 55 yields so as to permit the rear furrow wheel 12 to swing around into a position more or less parallel to the direction of travel (FIG. 6) and the land wheel 13 tends to take the position shown in full lines of FIG. 6. By virtue of the resteering arrangement incorporated in the disk tiller according to this invention, when the disks are raised, the land wheel is permitted to swing in a direction to bring it around into a position (dotted lines, FIG. 6) in line with the direction of travel thus eliminating the objectional effect of dragging the land wheel through the soft soil. In addition, this acts to narrow the implement for disposing the same in what might be termed a "semi-transport" position, which is done automatically as a result of raising or lowering the disks.

The link 29 is a telescopic member, being made up of two telescoping sections 51 and 52 the effective length of which is determined by set screw adjustment 53. By virtue of this adjustment, various degrees of lead may be imparted to the land wheel in the position shown in FIG. 2.

While we have shown and described above the preferred structure in which the principles of this invention have been illustrated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In a disk tiller, a main frame, a rear frame, a plurality of generally vertically shiftable disks movably connected with said main frame, means including a lift rod extending along said main frame for raising and lowering said disks, means connecting the midportion of said rear frame with the rear portion of said main frame, a steerable rear wheel connected with one end portion of said rear frame, and a connection between the rear end of said lift rod and said steerable rear wheel for steering the latter in response to movement of said lift rod.

2. In a disk tiller, frame means, a plurality of disks supported for generally up and down movement relative to said frame means, means including a lift rod movable along said frame means for shifting said disks generally vertically relative to said frame means, a steering wheel, a steering wheel spindle journaled in said frame and carrying said steering wheel, a steering arm fixed to said spindle, a lever pivoted on said frame means and having one end operatively connected with said lift rod whereby movement of the latter to lower said disks serves to swing said lever, and means including a link connecting the other end of said lever with said steering arm.

3. The invention set forth in claim 2, further characterized by stop means on said frame cooperating with said link to limit movement of said steering wheel in one direction.

4. The invention set forth in claim 3, further characterized by stop means on said frame means cooperating with said lever to limit movement of said steering wheel in the other direction.

5. In a disk tiller, a frame member, a steerable wheel, a generally vertical spindle journaled in said member and having a laterally extending axle section at its lower end and a laterally extending steering arm at its upper end, said wheel being journaled on said axle, a link pivoted to the outer end of said arm, a first abutment adjustably fixed to said link, a lever pivoted on said frame member and pivotally connected adjacent one end to said link, whereby rocking of said lever acts through said link to steer said steering wheel and a second abutment positioned on said frame member to serve as a stop cooperating with said first abutment to determine one position of said steering wheel.

References Cited by the Examiner

UNITED STATES PATENTS

| | | | |
|---|---|---|---|
| 640,411 | 1/1900 | Parlin et al. | 172—385 |
| 1,659,234 | 2/1928 | Boda | 172—386 |
| 2,648,270 | 8/1953 | Silver et al. | 172—386 |
| 2,697,394 | 12/1954 | Fyke | 172—386 |
| 2,764,076 | 9/1956 | Fowler | 172—405 X |

ABRAHAM G. STONE, *Primary Examiner.*

T. GRAHAM CRAVER, ANTONIO F. GUIDA,
*Examiners.*